(12) United States Patent
Li et al.

(10) Patent No.: US 11,127,399 B2
(45) Date of Patent: Sep. 21, 2021

(54) METHOD AND APPARATUS FOR PUSHING INFORMATION

(71) Applicant: Baidu Online Network Technology (Beijing) Co., Ltd., Beijing (CN)

(72) Inventors: Lan Li, Beijing (CN); Yuan Hu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 97 days.

(21) Appl. No.: 16/355,199

(22) Filed: Mar. 15, 2019

(65) Prior Publication Data

US 2020/0005782 A1    Jan. 2, 2020

(30) Foreign Application Priority Data

Jun. 29, 2018  (CN) .......................... 201810714399.8

(51) Int. Cl.
*G10L 15/22*     (2006.01)
*G10L 17/18*     (2013.01)
(Continued)

(52) U.S. Cl.
CPC .............. *G10L 15/22* (2013.01); *G10L 17/18* (2013.01); *H04L 67/26* (2013.01); *G06N 20/00* (2019.01); *G10L 2015/223* (2013.01)

(58) Field of Classification Search
CPC ............... G10L 15/22; G10L 2015/088; G10L 2015/223; G10L 15/01; G10L 15/08; G10L 15/1815; G10L 25/51; G10L 25/54; G10L 13/00; G10L 15/26; G06F 16/48; G06F 16/4387; G06F 16/4393; G06F 16/44; G06F 3/165; G06F 16/332; G06F 40/194;
(Continued)

(56) References Cited

U.S. PATENT DOCUMENTS 9,576,574 B2 *  2/2017  van Os ................... G06F 3/167
10,643,610 B2 *  5/2020  Lu ........................... G10L 15/22
(Continued)

FOREIGN PATENT DOCUMENTS

CN        105072302 A      11/2015
CN        106991123 A       7/2017
(Continued)

*Primary Examiner* — Vijay B Chawan
(74) *Attorney, Agent, or Firm* — Knobbe, Martens, Olson & Bear, LLP

(57) ABSTRACT

Embodiments of a method and apparatus for pushing information are provided. The method can include: determining whether a current service recipient matches a current information service mode, in response to receiving a request for information acquisition; performing an information push operation as follows in response to determining that the current service recipient matches the current information service mode: acquiring candidate push information corresponding to the request for information acquisition; determining target push information corresponding to the current service recipient from the candidate push information; and pushing the target push information to the current service recipient. Some embodiments implement pushing information to a service recipient based on an information service mode matched with the service recipient, which can improve the user experience.

14 Claims, 4 Drawing Sheets

(51) Int. Cl.
  *H04L 29/08* (2006.01)
  *G06N 20/00* (2019.01)
(58) Field of Classification Search
  CPC ....... G06F 40/197; H04L 67/10; H04L 67/26;
    H04L 67/42; H04N 21/2387; H04N
    21/25816; H04N 21/42203; H04N
    21/4316; H04W 12/00512; H04W
    12/00514; H04W 4/12
  USPC .......... 704/275, 270.1, 270, 235; 705/14.13;
    707/706, 722, 769; 709/201, 203, 212,
    709/228, 242, 244
  See application file for complete search history.

(56) References Cited

U.S. PATENT DOCUMENTS

| | | | | |
|---|---|---|---|---|
| 10,643,612 B2 * | 5/2020 | Wu | ................ | G10L 15/08 |
| 2002/0095454 A1 * | 7/2002 | Reed | ................ | H04L 67/28 |
| | | | | 709/201 |
| 2009/0209233 A1 * | 8/2009 | Morrison | ......... | G08G 1/096716 |
| | | | | 455/411 |
| 2010/0169091 A1 * | 7/2010 | Zurek | ................ | G06Q 30/02 |
| | | | | 704/235 |
| 2011/0043652 A1 * | 2/2011 | King | ................ | G06F 40/194 |
| | | | | 348/222.1 |
| 2013/0073608 A1 * | 3/2013 | Hu | ................ | H04M 15/70 |
| | | | | 709/203 |
| 2015/0310469 A1 * | 10/2015 | Bemmel | ............ | G06Q 30/0236 |
| | | | | 705/14.13 |
| 2019/0147050 A1 * | 5/2019 | Tian | ................ | G06F 16/435 |
| | | | | 707/722 |
| 2019/0147058 A1 * | 5/2019 | Lu | ................ | G06F 16/24575 |
| | | | | 707/727 |
| 2019/0147864 A1 * | 5/2019 | Lu | ................ | G06F 16/4387 |
| | | | | 704/275 |
| 2019/0295543 A1 * | 9/2019 | Wu | ................ | G10L 25/51 |

FOREIGN PATENT DOCUMENTS

| | | |
|---|---|---|
| CN | 108021622 A | 5/2018 |
| KR | 10-2013-082902 A | 7/2013 |

* cited by examiner

METHOD AND APPARATUS FOR PUSHING INFORMATION

CROSS-REFERENCE TO RELATED APPLICATIONS

This disclosure claims priority to Chinese Patent Application no. 201810714399.8, filed with the China National Intellectual Property Administration (CNIPA) on Jun. 29, 2018, the contents of which are incorporated herein by reference in their entirety.

TECHNICAL FIELD

Embodiments of the present disclosure relate to the field of computer technology, specifically to the field of Internet technology, and more specifically to a method and apparatus for pushing information.

BACKGROUND

With the rapid development of artificial intelligence, smart devices (such as smart speakers, smart phones) are popularized. Users may access various information more conveniently and quickly through the smart devices.

A smart device may push information to a user based on a request from the user. In practice, a smart voice device may provide information services for multiple users. For the same request of different users, the information pushed by the smart voice device has no difference.

SUMMARY

Embodiments of the present disclosure provide a method and apparatus for pushing information.

In a first aspect, the embodiments of the present disclosure provide a method for pushing information, the method including: determining whether a current service recipient matches a current information service mode, in response to receiving a request for information acquisition; performing an information push operation as follows in response to determining that the current service recipient matches the current information service mode: acquiring candidate push information corresponding to the request for information acquisition; determining target push information corresponding to the current service recipient from the candidate push information; and pushing the target push information to the current service recipient.

In some embodiments, the request for information acquisition is a voice request, and the determining whether a current service recipient matches a current information service mode, in response to receiving a request for information acquisition, includes: determining an age corresponding to the current service recipient based on the voice request of the current service recipient; and judging whether the determined age matches an age range indicated by the current information service mode.

In some embodiments, the request for information acquisition is a voice request, and the determining whether a current service recipient matches a current information service mode, in response to receiving a request for information acquisition, includes: determining identity information of the current service recipient based on voiceprint recognition, in response to receiving the request for information acquisition of the current service recipient; and determining whether the current service recipient matches the current information service mode based on a historical information service mode corresponding to the identity information.

In some embodiments, the pushing the target push information to the current service recipient, includes: playing a voice corresponding to the target push information.

In some embodiments, the determining target push information corresponding to the current service recipient from the candidate push information includes: acquiring an age range corresponding to a historical service recipient of a plurality of pieces of the candidate push information; clustering the plurality of pieces of the candidate push information based on the age range corresponding to the historical service recipient, to obtain a plurality of classes; and selecting at least one piece of the candidate push information in the class corresponding to the age range indicated by the current information service mode as the target push information.

In a second aspect, the embodiments of the present disclosure provide an apparatus for pushing information, the apparatus including: a determination unit, configured to determine whether a current service recipient matches a current information service mode, in response to receiving a request for information acquisition; and an information push unit, configured to, perform an information push operation as follows in response to determining that the current service recipient matches the current information service mode: acquiring candidate push information corresponding to the request for information acquisition; determining target push information corresponding to the current service recipient from the candidate push information; and pushing the target push information to the current service recipient.

In some embodiments, the request for information acquisition is a voice request, and the determination unit is further configured to: determine an age corresponding to the current service recipient based on the voice request of the current service recipient; and judge whether the determined age matches an age range indicated by the current information service mode.

In some embodiments, the request for information acquisition is a voice request, and the determination unit is further configured to: determine identity information of the current service recipient based on voiceprint recognition, in response to receiving the request for information acquisition of the current service recipient; and determine whether the current service recipient matches the current information service mode based on a historical information service mode corresponding to the identity information.

In some embodiments, the information push unit is further configured to: play a voice corresponding to the target push information.

In some embodiments, the information push unit is further configured to: acquire an age range corresponding to a historical service recipient of a plurality of pieces of the candidate push information; cluster the plurality of pieces of the candidate push information based on the age range corresponding to the historical service recipient, to obtain a plurality of classes; and select at least one piece of the candidate push information in the class corresponding to the age range indicated by the current information service mode as the target push information.

In a third aspect, the embodiments of the present disclosure provide an electronic device, including: one or more processors; and a storage apparatus, storing one or more programs thereon, the one or more programs, when executed by the one or more processors, cause the one or more processors to implement the method according to any one of the embodiments in the first aspect.

In a fourth aspect, the embodiments of the present disclosure provide a computer readable medium, storing a computer program thereon, the computer program, when executed by a processor, implements the method according to any one of the embodiments in the first aspect.

The method and apparatus for pushing information provided by the embodiments of the present disclosure determine whether a current service recipient matches a current information service mode, in response to receiving a request for information acquisition, perform an information push operation as follows in response to determining that the current service recipient matches the current information service mode: acquiring candidate push information corresponding to the request for information acquisition, determining target push information corresponding to the current service recipient from the candidate push information, and pushing the target push information to the current service recipient. The method and apparatus implement pushing information to a service recipient based on an information service mode matched with the current service recipient, that is, information matching the current service recipient may be selected from multiple pieces of information matching the request for information acquisition for pushing, which may improve the user experience. In addition, it may also improve the pertinence of information push.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
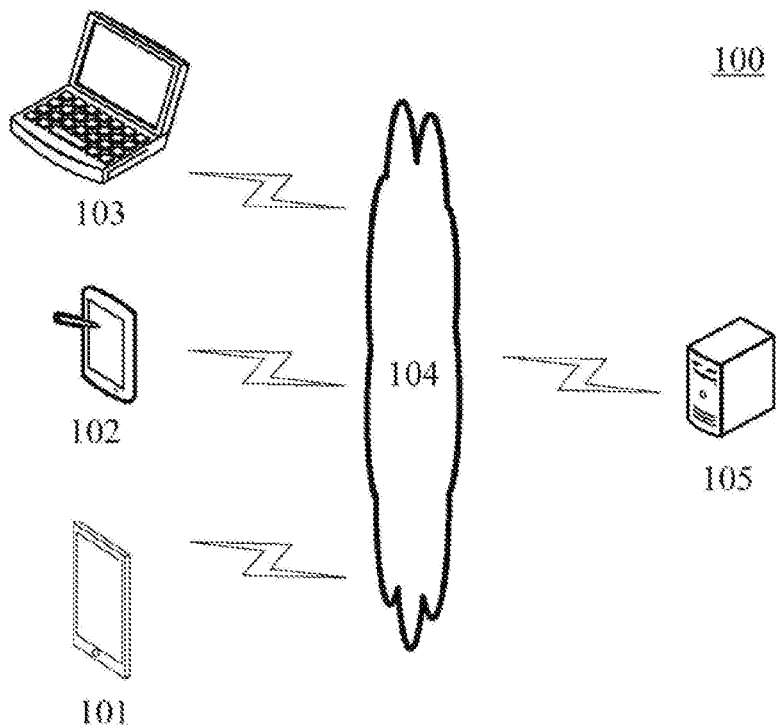
FIG. 1 is an exemplary system architecture diagram to which a method for pushing information of an embodiment of the present disclosure may be applied.

FIG. 1 illustrates an exemplary system architecture 100 to which an embodiment of a method for pushing information of the present disclosure may be applied.

As shown in FIG. 1, the system architecture 100 may include terminal device 101, 102, or 103, a network 104, and a server 105. The network 104 is configured to provide a communication link medium between the terminal device 101, 102, or 103 and the server 105. The network 104 may include various types of connections, such as wired, wireless communication links, or optical fibers, and the like.

A user may interact with the server 105 via the network 104 using the terminal device 101, 102, or 103. For example, the user may issue a voice command to the terminal device 101, 102, or 103. The terminal device 101, 102, or 103 may receive the voice command from the user and send a voice service request to the server 105 over the network. The terminal device 101, 102, or 103 may receive information pushed by the server 105 after analyzing and processing the voice service request. The terminal device 101, 102, or 103 may also play the information pushed by the server to the user. The terminal device 101, 102, or 103 may be installed with various client applications, such as client applications supporting voice services, and client applications supporting video services.

The terminal device 101, 102, or 103 may be hardware or software. When the terminal device 101, 102, or 103 is hardware, it may be various electronic devices supporting voice interaction, including but not limited to smart phones, tablets, laptop portable computers, desktop computers, learning machines, intelligent robots, smart TVs, smart speakers, etc. When the terminal device 101, 102, or 103 is software, it may be installed in the above-listed electronic devices. It may be implemented as a plurality of software or software modules (for example, software or software modules for providing distributed services), or as a single software or software module, which is not specifically limited here.

The server 105 may be a server that provides various services, such as a back-end server that provides support for voice services and video services on the terminal device 101, 102, or 103. The back-end server may perform processing such as analyzing the voice request received from the terminal device, and feed back the processing result (for example, push information) to the terminal devices.

It should be noted that the method for pushing information provided by the embodiments of the present disclosure may be executed by the server 105, or may be executed by the terminal device 101, 102, or 103. Accordingly, the apparatus for pushing information may be provided in the server 105, or may be provided in the terminal device 101, 102, or 103. The present disclosure is not limited in this regard. When the method for pushing information is executed by the terminal device 101, 102, or 103, the server 105 may not be included in the system shown in FIG. 1.

It should be noted that the server may be hardware or software. When the server is hardware, it may be implemented as a distributed server cluster composed of multiple servers, or as a single server. When the server is software, it may be implemented as a plurality of software or software modules (for example, software or software modules for providing distributed services), or as a single software or software module, which is not specifically limited here.

It should be appreciated that the numbers of the terminal devices, the networks, and the servers in FIG. 1 are merely illustrative. Any number of terminal devices, networks, and servers may be provided based on the implementation requirements.

Figure 2:
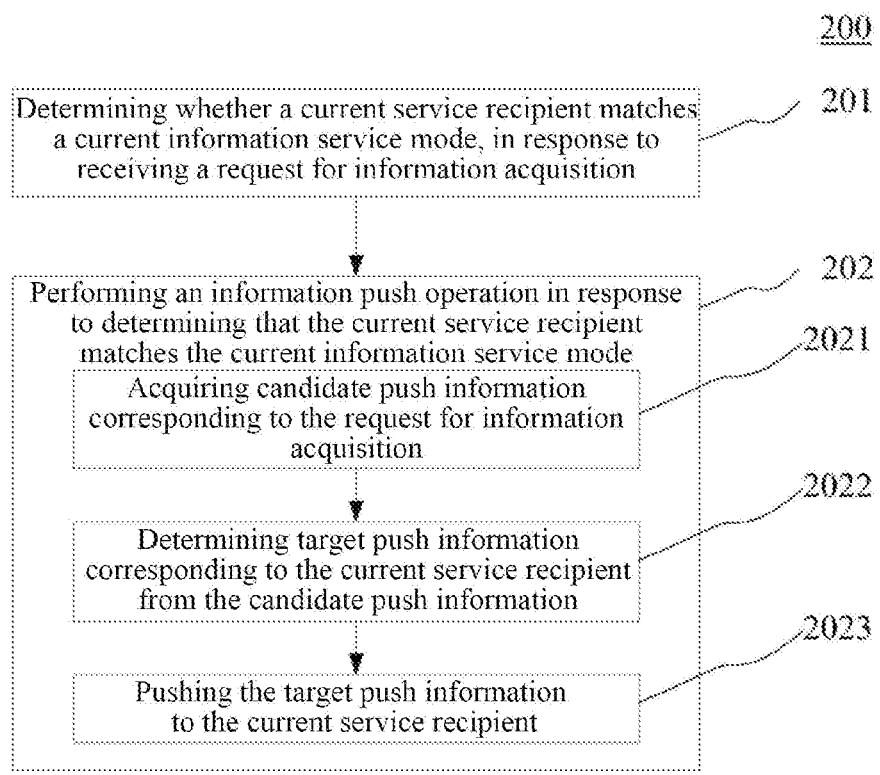
FIG. 2 is a flowchart of an embodiment of the method for pushing information according to the present disclosure.

With further reference to FIG. 2, a flow 200 of an embodiment of a method for pushing information according to the present disclosure is illustrated. The method for pushing information includes the following steps:

Step 201, determining whether a current service recipient matches a current information service mode, in response to receiving a request for information acquisition.

In the present embodiment, the current service recipient issues a request for information acquisition to a terminal device (for example, the terminal device shown in FIG. 1). The request for information acquisition here may be a voice request, or may be a text request or the like.

After receiving the request for information acquisition of the current service recipient, the terminal device may send the request for information acquisition of the current service recipient to the executor of the method for pushing information (for example, the server shown in FIG. 1) through a wired connection or a wireless connection.

The executor determines whether the current service recipient matches the current information service mode, in response to receiving the request for information acquisition.

A plurality of information service modes may be set in the executor. For example, different information service modes may be set for different age groups, specifically: the information service mode corresponding to the service recipient aged 1 to 6 years old is the infant information service mode; the information service mode corresponding to the service recipient aged 6 to 13 years old is the child information service mode; the information service mode corresponding to the service recipient aged 14 to 18 years old is the juvenile information service mode; the information service mode corresponding to the service recipient aged 19 to 30 years old is the youth information service mode; the information service mode corresponding to the service recipient aged 30 to 40 years old is the young and middle-aged information service mode; the information service mode corresponding to the service recipient aged 40 to 50 years old is the middle-aged information service mode; the information service mode corresponding to the service recipient aged 50 to 60 years old is the middle-aged and senior information service mode; and the information service mode corresponding to the service recipient of the age of 60 or above is the senior information service mode. It may be understood that the age range here may be set based on specific needs. That is, in the present embodiment, different information service modes may correspond to different age ranges.

When information services are provided to the service recipient in each information service mode, information that matches the age range indicated by the information service mode may be preferentially provided to the service recipient according to various methods. For example, if the current information service mode is the senior information service mode, when receiving a request for information acquisition for playing a song, priority for pushing may be given to songs with high broadcasting rate/audience rate of senior people.

In some application scenarios, a default information service mode set by the user through the terminal device may be stored in the executor. Specifically, the executor may associate and store identity information of any terminal device and the default information service mode preset by the user corresponding to the terminal device identity information. The identity information of the terminal device here may be identification information of the terminal device.

In some other application scenarios, the executor may provide information services to a plurality of service recipients through one terminal device. After each time the information service is provided to the service recipient, the executor may set the information service mode of the information service provided this time as the default information service mode corresponding to the identity information of the device.

In some application scenarios, the executor may also associate and store the identity information of the service recipient with the information service mode that matches the identity information of the service recipient. In these application scenarios, the executor may acquire the identity information of the service recipient by voice question and answer through the terminal device. In addition, the executor may acquire information service modes set by the user in various methods through the terminal device.

When receiving the request for information acquisition of the current service recipient through the terminal device, the executor may first determine the identity information of the current service recipient by using various methods. The identity information of the service recipient here may be, for example, identification information for distinguishing different service recipients.

It may then be determined if the identity information of the current service recipient matches the current default information service mode of the terminal device identity. For example, the current default information service mode of the terminal device is determined, and then it is determined whether the current default information service mode of the terminal device is the same as the pre-stored information service mode associated with the identity information of the current service recipient. If they are the same, it is determined that the current service recipient matches the current information service mode. Otherwise, it is determined that the current service recipient does not match the current information service recipient.

In some alternative implementations of the present embodiment, the request for information acquisition of the current service recipient may be a voice request. The step 201 of determining whether the current service recipient matches the current information service mode, in response to receiving the request for information acquisition may include the following sub-steps:

Sub-step 2011, determining an age corresponding to the current service recipient based on a voice request, in response to receiving the voice request for information acquisition of the current service recipient.

In the present embodiment, in response to receiving the voice request for information acquisition of the current service recipient, the executor of the method for pushing information (for example, the server shown in FIG. 1) may determine the age corresponding to the current service recipient based on the voice request.

The acoustic characteristics of a person, such as the fundamental frequency value, speech rate, sound pressure level, voice quality, and sound energy spectral distribution, may be extracted from the voice information of the person. For the same person, the acoustic characteristics of the person change at different ages. To some extent, the age of the person may be estimated from the acoustic characteristics of the person.

A machine learning method may be used in estimating the age of a person based on the acoustic characteristics of the person. For example, a machine learning method such as a decision-making tree method, an artificial neural network algorithm, a naive Bayesian classification method, or a support vector machine method may be used to estimate the age of the person based on the acoustic characteristics of the person.

The executor may first extract various acoustic characteristics of the current service recipient, and then use the above machine learning method to estimate the age of the current service recipient based on the various acoustic characteristics.

In some application scenarios, the executor may send the voice request to a remote server, and the remote server extracts various acoustic characteristics of the current service recipient from the voice request, and then the remote server uses the above machine learning method to determine the age of the current service recipient based on the various acoustic characteristics. Finally, the remote server sends the determined age of the current service recipient to the executor.

Sub-step 2012, judging whether the determined age matches an age range indicated by the current information service mode.

In the present embodiment, the executor may judge whether the determined age matches an age range indicated by the current information service mode.

Specifically, after determining the age of the current service recipient in step 2011, the age of the current service recipient may be compared with the age range indicated by the current information service mode. If the determined age of the current service recipient is located within the age range indicated by the current information service mode, it is determined that the determined age matches the age range indicated by the current information service mode. Otherwise, it is determined that the age of the current service recipient does not match the current information service mode.

When the age of the current service recipient matches the current information service mode, it is determined that the current service recipient matches the current information service mode.

Step 202, performing an information push operation in response to determining that the current service recipient matches the current information service mode.

In the present embodiment, if the executor determines that the current service recipient matches the current information service mode, the information push operation is performed.

In the present embodiment, the information push operation may include the following sub-steps:

Sub-step 2021, acquiring candidate push information corresponding to the request for information acquisition.

The executor may acquire candidate push information corresponding to the request for information acquisition. For example, if the request for information acquisition is "Playing the song Night in the Prairie," the executor may acquire a plurality of versions of the "Night in the Prairie" from the Internet as the candidate push information.

In some application scenarios, the executor may first acquire the text data of the request for information acquisition, then analyze the semantics of the text data, and finally acquire a plurality of pieces of information matching the semantics of the text data from the Internet as the candidate push information. Specifically, a topic model semantic analysis method, a word vector based semantic analysis method, or a neural network based semantic analysis method may be used in analyzing the semantics of the text data. It should be noted that the topic model semantic analysis method, word vector based semantic analysis method, and neural network based semantic analysis method are well-known technologies widely studied and used, and detailed descriptions thereof will be omitted.

In some application scenarios, the executor may crawl the Internet through a crawler technology searching for a plurality of pieces of information including keywords related to the request for information acquisition and using as the candidate push information.

Sub-step 2022, determining target push information corresponding to the current service recipient from the candidate push information.

The executor may determine the target push information corresponding to the current service recipient from the candidate push information by using various analysis methods.

In some alternative implementations of the present embodiment, the step of determining push information corresponding to the current service recipient from the candidate push information (sub-step 2022) may further include the following steps:

First, acquiring an age range corresponding to a historical service recipient of a plurality of pieces of the candidate push information.

Secondly, clustering the plurality of pieces of the candidate push information based on the age range corresponding to the historical service recipient, to obtain a plurality of classes.

Thirdly, selecting at least one piece of the candidate push information in the class corresponding to the age range indicated by the current information service mode as the target push information.

In this way, at least one piece of target push information corresponding to the age range in which the current service recipient is located may be determined from the plurality of pieces of the candidate push information.

For example, if the current service recipient is a senior person, the current information service mode is the senior information service mode. When the request for information acquisition is "I want to hear a crosstalk", at least one crosstalk determined by the above method is preferentially pushed, For example, Mr. Ma Sanli's classic crosstalk.

Sub-step 2023, pushing the target push information to the current service recipient.

In the present embodiment, the executor may push the target push information to the current service recipient.

Specifically, the executor may push the target push information to the terminal device corresponding to the current service recipient.

In some alternative implementations of the present embodiment, the execution body may push the target push information to the terminal device corresponding to the current service recipient in the form of audio information, and then play the voice corresponding to the target push information by the terminal device. Alternatively, the executor pushes the target push information in the form of video information to the terminal device corresponding to the current service recipient, and the terminal device plays the video corresponding to the target push information.

Figure 3:
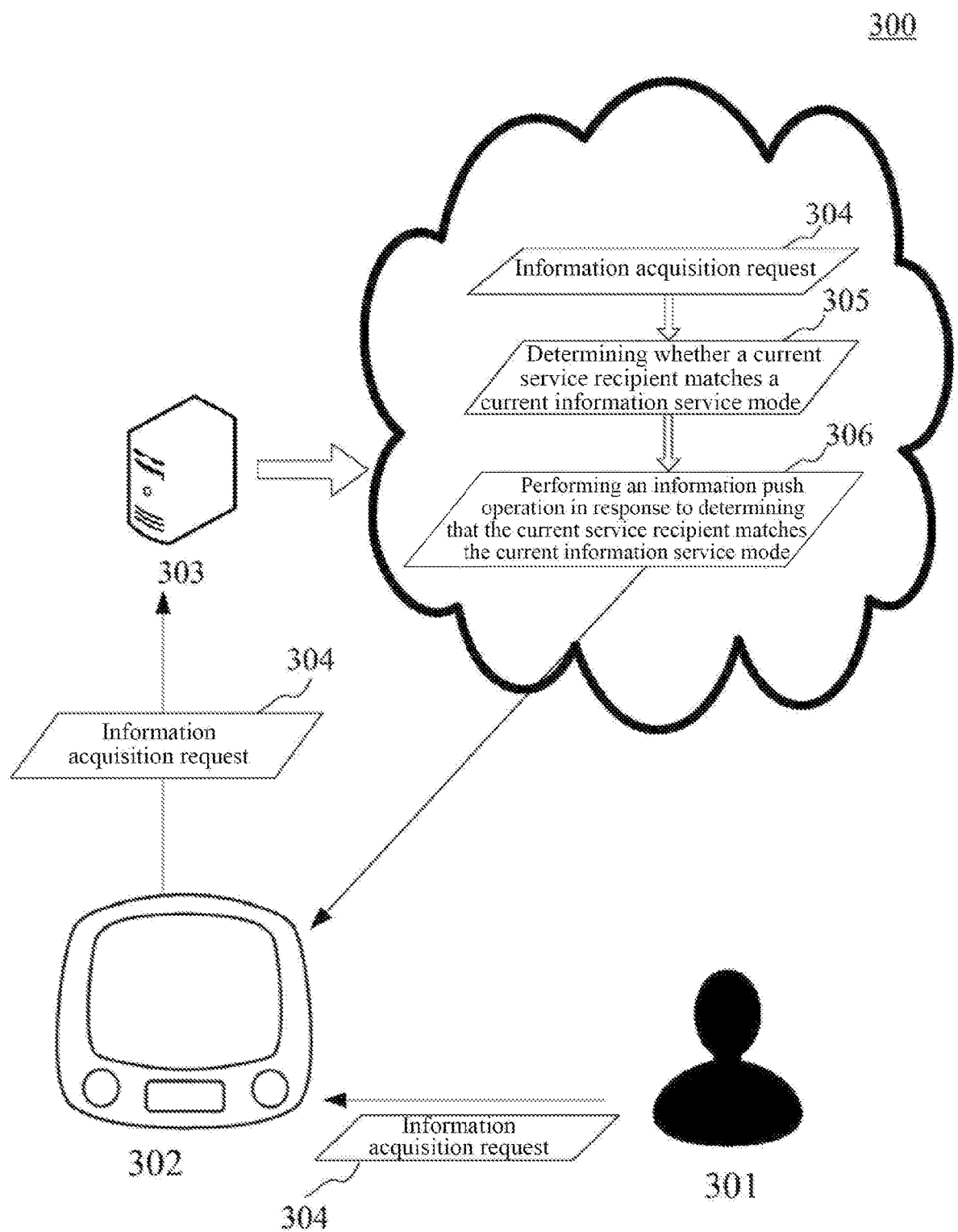
FIG. 3 is a schematic diagram of an application scenario of the method for pushing information according an embodiment of the present disclosure.

With further reference to FIG. 3, a schematic diagram of an application scenario of the method for pushing information according to the present embodiment is illustrated. In the application scenario of FIG. 3, a current service recipient 301 first issues a request for information acquisition 304 to a terminal device 302. Then, the terminal device 302 sends the request for information acquisition 304 to a server 303. In response to receiving the request for information acquisition 304, the server 303 determines whether the current service recipient matches a current information service mode 305 corresponding to the terminal device. If the current service recipient matches the current information service mode 305, the following information push operation 306 is performed: acquiring candidate push information corresponding to the request for information acquisition; determining target push information corresponding to the current service recipient from the candidate push information; and the server 303 pushing the target push information to the terminal device 302 to cause the terminal device 302 to play the voice of the target push information to the current service recipient 301.

The method provided by the embodiments of the present disclosure determines whether a current service recipient matches a current information service mode, in response to receiving a request for information acquisition, performs an information push operation as follows in response to determining that the current service recipient matches the current information service mode: acquiring candidate push information corresponding to the request for information acquisition, determining target push information corresponding to the current service recipient from the candidate push information, and pushing the target push information to the current service recipient. The method implements pushing information to a service recipient based on an information service mode matched with the current service recipient, that is, information matching the current service recipient may be selected from a plurality of pieces of information matching the request for information acquisition for pushing, which may improve the user experience. In addition, it may also improve the pertinence of information push.

Figure 4:
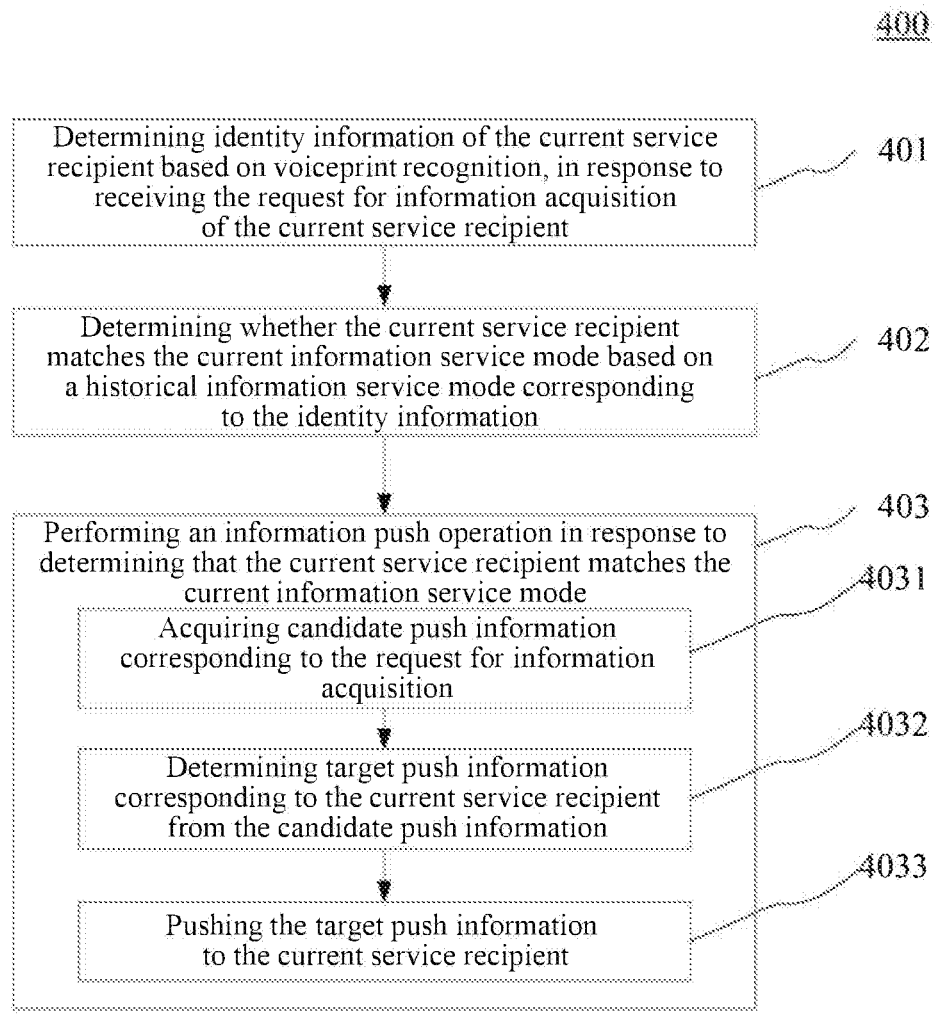
FIG. 4 is a flowchart of another embodiment of the method for pushing information according to the present disclosure.

With further reference to FIG. 4, a flow 400 of another embodiment of the method for pushing information is illustrated. The flow 400 of the method for pushing information includes the following steps:

Step 401, determining identity information of the current service recipient based on voiceprint recognition, in response to receiving the request for information acquisition of the current service recipient. In the present embodiment, the request for information acquisition sent by the current service recipient may be, for example, a voice request.

In the present embodiment, in response to receiving the request for information acquisition of the current service recipient, the executor of the method for pushing information (for example, the server shown in FIG. 1) may determine identity information of the current service recipient based on the voice request. The identity information of the service recipient here may be, for example, identification information for distinguishing different service recipients.

The acoustic characteristics of a person, such as the fundamental frequency value, speech rate, sound pressure level, voice quality, and sound energy spectral distribution, may be extracted from the speech information of the person. Then, the identity information of the user is analyzed from these acoustic characteristics.

In the present embodiment, when any service recipient interacts with the executor through the terminal device for the first time, the terminal device may be used to transmit voice information for identifying the identity information of the service recipient to the executor in the form of voice. The voice information for identifying the identity information of the service recipient may include any sentence. The executor may establish the identity information of the service recipient and the acoustic characteristics corresponding to the identity information based on the voice information. The identity information of the service recipient here may be any identification information used to distinguish different service recipients. In addition, the executor may also associate and store, in a preset database, acoustic characteristics corresponding to each of the identity information of the plurality of service recipients.

When the current service recipient sends the voice request for information acquisition to the executor through the terminal device, the executor may extract the voice request and extract the acoustic characteristics of the current service recipient from the voice request. The acoustic characteristics extracted from the voice request are then compared with the acoustic characteristics corresponding to the identity information of the plurality of service recipients stored in the preset database in advance. If a match is found, the identity information of a pre-stored service recipient that matches the acoustic characteristics of the voice request is determined as the identity information of the current service recipient.

Step 402, determining whether the current service recipient matches the current information service mode based on a historical information service mode corresponding to the identity information.

In the present embodiment, the executor may associate and store the identity information of each service recipient and each information service mode corresponding to the identity information in the preset database. The preset database may be set locally in the executor, or may be disposed in an electronic device that can communicate with the executor.

After the executor determines the identity information of the current service recipient in step 401, the executor may search for a historical information service mode corresponding to the identity information in the preset database.

After finding the historical information service mode corresponding to the identity information of the current service recipient, it may be determined whether the current information service mode and the historical information service mode corresponding to the terminal device are the same. If they are the same, it may be determined that the current service recipient matches the current information service mode; if not, it may be determined that the current service recipient does not match the current information service mode. For example, assuming that the information service mode corresponding to a plurality of requests for information acquisition in the historical information service mode corresponding to the identity information is the senior information service mode, and if the current information service mode is the youth information service mode, it may be determined that the current service recipient and the current information service mode does not match. If the current information service mode is the senior information service mode, it may be determined that the current service recipient matches the current information service mode.

Step 403, performing an information push operation in response to determining that the current service recipient matches the current information service mode.

If it is determined in step 402 that the current service recipient matches the current information service mode, the executor may perform the information push operation.

The information push operation may include the following sub-steps:

Sub-step 4031, acquiring candidate push information corresponding to the request for information acquisition.

Sub-step 4032, determining target push information corresponding to the current service recipient from the candidate push information.

Sub-step 4033, pushing the target push information to the current service recipient.

Step 403 and the sub-steps thereof may be performed in a similar method to step 202 and the sub-steps thereof of the embodiment shown in FIG. 2, and detailed descriptions thereof will be omitted.

As can be seen from FIG. 4, compared with the embodiment corresponding to FIG. 2, the flow 400 of the method for pushing information in the present embodiment highlights the step of determining the identity information of the current service recipient based on the voice request of the current service recipient, and determining whether the current service recipient matches the current information service mode based on the historical information service mode corresponding to the identity information, thereby implementing pushing information to the current service recipient based on the historical information service mode provided to the current service recipient. The push information pushed to the current service recipient is made more relevant to the needs of the current service recipient, thereby further improving the user experience.

Figure 5:
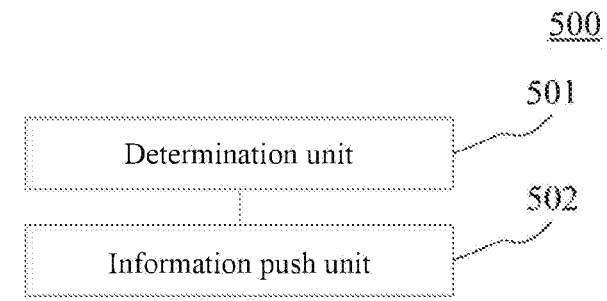
FIG. 5 is a schematic structural diagram of an embodiment of an apparatus for pushing information according to the present disclosure.

With further reference to FIG. 5, as an implementation of the method shown in the above figures, the present disclosure provides an embodiment of an apparatus for pushing information, and the apparatus embodiment corresponds to the method embodiment as shown in FIG. 2, and the apparatus may be specifically applied to various electronic devices.

As shown in FIG. 5, the apparatus 500 for pushing information of the present embodiment includes: a determination unit 501 and an information push unit 502. The determination unit 501 is configured to determine whether a current service recipient matches a current information service mode, in response to receiving a request for information acquisition. The information push unit 502 is configured to perform an information push operation as follows in response to determining that the current service recipient matches the current information service mode: acquiring candidate push information corresponding to the request for information acquisition; determining target push information corresponding to the current service recipient from the candidate push information; and pushing the target push information to the current service recipient.

In the present embodiment, the specific processing of the determination unit 501 and the information push unit 502 of the apparatus 500 for pushing information and the technical effects thereof may refer to the related descriptions of the steps 201 and 202 in the corresponding embodiment of FIG. 2, and detailed descriptions thereof will be omitted.

In some alternative implementations of the present embodiment, the request for information acquisition is a voice request, and the determination unit 501 is further configured to: determine an age corresponding to the current service recipient based on the voice request of the current service recipient; and judge whether the determined age matches an age range indicated by the current information service mode.

In some alternative implementations of the present embodiment, the request for information acquisition is a voice request, and the determination unit 501 is further configured to: determine identity information of the current service recipient based on voiceprint recognition, in response to receiving the request for information acquisition of the current service recipient; and determine whether the current service recipient matches the current information service mode based on a historical information service mode corresponding to the identity information.

In some alternative implementations of the present embodiment, the information push unit 502 is further configured to: play a voice corresponding to the target push information.

In some alternative implementations of the present embodiment, the information push unit 502 is further configured to: acquire an age range corresponding to a historical service recipient of a plurality of pieces of the candidate push information; cluster the plurality of pieces of the candidate push information based on the age range corresponding to the historical service recipient, to obtain a plurality of classes; and select at least one piece of the candidate push information in the class corresponding to the age range indicated by the current information service mode as the target push information.

Figure 6:
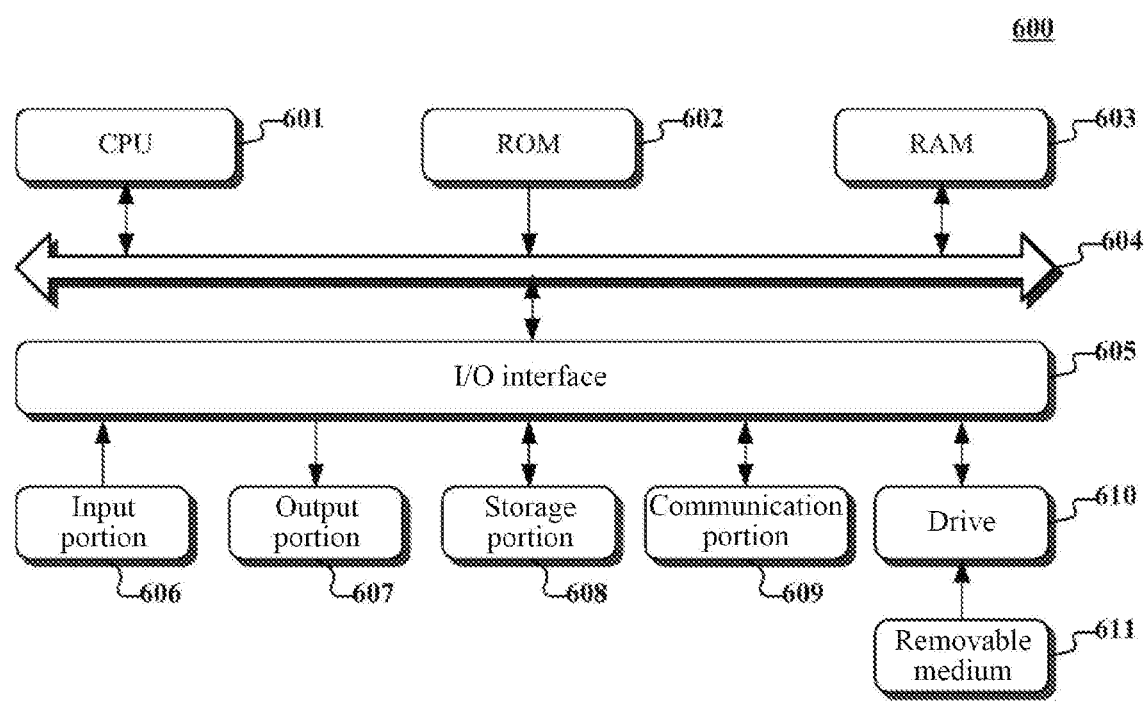
FIG. 6 is a schematic structural diagram of a computer system adapted to implement an electronic device of the embodiments of the present disclosure.

With further reference to FIG. 6, a schematic structural diagram of a computer system 600 adapted to implement a server of the embodiments of the present disclosure is shown. The server shown in FIG. 6 is merely an example, and should not impose any limitation on the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including such as a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In some embodiments of the present disclosure, the computer readable storage medium may be any physical medium containing or storing programs which may be used by a command execution system, apparatus or element or incorporated thereto. In some embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, described as: a processor, including a determination unit and an information push unit. Here, the names of these units do not in some cases constitute a limitation to such units themselves. For example, the determination unit may also be described as "a unit for determining whether a current service recipient matches a current information service mode, in response to receiving a request for information acquisition."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: determine whether a current service recipient matches a current information service mode, in response to receiving a request for information acquisition; perform an information push operation as follows in response to determining that the current service recipient matches the current information service mode: acquire candidate push information corresponding to the request for information acquisition; determine target push information corresponding to the current service recipient from the candidate push information; and push the target push information to the current service recipient.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for pushing information, the method comprising:
   determining whether an age corresponding to a current service recipient matches a current information service mode, in response to receiving a request for information acquisition;
   performing an information push operation as follows in response to determining that the age corresponding to the current service recipient matches the current information service mode:
   acquiring candidate push information corresponding to the request for information acquisition;
   determining target push information corresponding to the current service recipient from the candidate push information, the target push information being information corresponding to an age range in which the age of the current service recipient is located; and
   pushing the target push information to the current service recipient;

wherein the request for information acquisition is a voice request, and
determining whether the age corresponding to the current service recipient matches the current information service mode, in response to receiving the request for information acquisition, by:
determining the age corresponding to the current service recipient based on the voice request of the current service recipient; and
determining whether the determined age matches an age range indicated by the current information service mode;
wherein the method is performed by at least one hardware processor.

2. The method according to claim 1, wherein the pushing the target push information to the current service recipient comprises:
playing a voice corresponding to the target push information.

3. The method according to claim 1, wherein the determining target push information corresponding to the current service recipient from the candidate push information comprises:
acquiring an age range corresponding to a historical service recipient of a plurality of pieces of the candidate push information;
clustering the plurality of pieces of the candidate push information based on the age range corresponding to the historical service recipient, to obtain a plurality of classes; and
selecting at least one piece of the candidate push information in the class corresponding to the age range indicated by the current information service mode as the target push information.

4. The method according to claim 1, wherein the determining the age corresponding to the current service recipient based on the voice request of the current service recipient comprises:
extracting acoustic characteristics of the current service recipient from the voice request of the current service recipient; and
estimating the age corresponding to the current service recipient based on the acoustic characteristics of the current service recipient.

5. The method according to claim 1, wherein determining the age corresponding to the current service recipient based on the voice request of the current service recipient comprises: determining the age corresponding to the current service recipient based on a fundamental frequency value of the voice request.

6. The method according to claim 1, wherein determining the age corresponding to the current service recipient based on the voice request of the current service recipient comprises: determining the age corresponding to the current service recipient based on a speech rate of the voice request.

7. The method according to claim 1, wherein determining the age corresponding to the current service recipient based on the voice request of the current service recipient comprises: determining the age corresponding to the current service recipient based on a sound pressure level of the voice request.

8. The method according to claim 1, wherein determining the age corresponding to the current service recipient based on the voice request of the current service recipient comprises: determining the age corresponding to the current service recipient based on a voice quality of the voice request.

9. The method according to claim 1, wherein determining the age corresponding to the current service recipient based on the voice request of the current service recipient comprises: determining the age corresponding to the current service recipient based on a sound energy spectral distribution of the voice request.

10. An apparatus for pushing information, the apparatus comprising:
at least one processor; and
a memory storing instructions, the instructions when executed by the at least one processor, cause the at least one processor to perform operations, the operations comprising:
determining whether an age corresponding to a current service recipient matches a current information service mode, in response to receiving a request for information acquisition; and
performing an information push operation as follows in response to determining that the age corresponding to the current service recipient matches the current information service mode: acquiring candidate push information corresponding to the request for information acquisition; determining target push information corresponding to the current service recipient from the candidate push information, the target push information being information corresponding to an age range in which the age of the current service recipient is located; and pushing the target push information to the current service recipient;
wherein the request for information acquisition is a voice request, and
determining whether the age corresponding to the current service recipient matches the current information service mode, in response to receiving the request for information acquisition, by:
determining an age corresponding to the current service recipient based on the voice request of the current service recipient; and
determining whether the determined age matches an age range indicated by the current information service mode.

11. The apparatus according to claim 10, wherein the pushing the target push information to the current service recipient comprises:
playing a voice corresponding to the target push information.

12. The apparatus according to claim 10, wherein the determining target push information corresponding to the current service recipient from the candidate push information comprises:
acquiring an age range corresponding to a historical service recipient of a plurality of pieces of the candidate push information;
clustering the plurality of pieces of the candidate push information based on the age range corresponding to the historical service recipient, to obtain a plurality of classes; and
selecting at least one piece of the candidate push information in the class corresponding to the age range indicated by the current information service mode as the target push information.

13. The apparatus according to claim 10, wherein the determining the age corresponding to the current service recipient based on the voice request of the current service recipient comprises:

extracting acoustic characteristics of the current service recipient from the voice request of the current service recipient; and estimating the age corresponding to the current service recipient based on the acoustic characteristics of the current service recipient.

14. A non-transitory computer-readable storage medium storing a computer program, the computer program when executed by one or more processors, causes the one or more processors to perform operations, the operations comprising:

determining whether an age corresponding to a current service recipient matches a current information service mode, in response to receiving a request for information acquisition;

performing an information push operation as follows in response to determining that the age corresponding to the current service recipient matches the current information service mode:

acquiring candidate push information corresponding to the request for information acquisition;

determining target push information corresponding to the current service recipient from the candidate push information, the target push information being information corresponding to an age range in which the age of the current service recipient is located; and pushing the target push information to the current service recipient;

wherein the request for information acquisition is a voice request, and determining whether the age corresponding to the current service recipient matches the current information service mode, in response to receiving the request for information acquisition, by:

determining an age corresponding to the current service recipient based on the voice request of the current service recipient; and determining whether the determined age matches an age range indicated by the current information service mode.

* * * * *

UNITED STATES PATENT AND TRADEMARK OFFICE
CERTIFICATE OF CORRECTION

PATENT NO. : 11,127,399 B2  
APPLICATION NO. : 16/355199  
DATED : September 21, 2021  
INVENTOR(S) : Lan Li et al.

Page 1 of 1

It is certified that error appears in the above-identified patent and that said Letters Patent is hereby corrected as shown below:

On the Title Page

Item (73), Lines 1-2, under Assignee, delete "Baidu Online Network Technology (Beijing) Co., Ltd., Beijing (CN)" and insert --Baidu Online Network Technology (Beijing) Co., Ltd., Beijing (CN); Shanghai Xiaodu Technology Co., Ltd.--.

Signed and Sealed this  
Twenty-third Day of May, 2023

Katherine Kelly Vidal  
*Director of the United States Patent and Trademark Office*